(12) United States Patent
Ozawa (10) Patent No.: US 6,537,090 B2
(45) Date of Patent: Mar. 25, 2003

(54) CARD CONNECTOR HAVING CAM AND PIN MEMBERS FOR SECURING A CARD

(75) Inventor: Hiroshi Ozawa, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 09/951,412

(22) Filed: Sep. 14, 2001

(65) Prior Publication Data

US 2002/0037658 A1 Mar. 28, 2002

(30) Foreign Application Priority Data

Sep. 27, 2000 (JP) ........................................ 2000-294404

(51) Int. Cl.[7] .............................................. H01R 13/62
(52) U.S. Cl. ...................................................... 439/159
(58) Field of Search ................................ 439/159, 152, 439/155; 361/754

(56) References Cited

U.S. PATENT DOCUMENTS 6,071,135 A * 6/2000 Obara ......................... 439/159
6,142,801 A * 11/2000 Koseki et al. .............. 439/159

FOREIGN PATENT DOCUMENTS

JP          11-135192          5/1999

* cited by examiner

Primary Examiner—Javaid Nasri
(74) Attorney, Agent, or Firm—Kanesaka & Takeuchi (57) ABSTRACT

A card connector comprises a case (1) for retaining a detachable card (60), a cam member (15) provided in a side wall (8) of the case (1) and having an engaging portion (17), an ejector (2) biased forwardly in the removal direction of the card (60) and being slidable together with the card (60) along the side wall (8), a pin member (36) supported by the ejector (2) so as to operate along the cam member (15), a pin control (42) provided on the ejector (2) for biasing the pin member (36) toward the cam member 15 to restrict movement of the pin member (36), wherein when the card (60) is inserted into the case (1) to a predetermined position, the pin member (36) engages the engaging portion (17) of the cam member (15) and the pin control (42) biases the pin member (36) toward the cam member (15) thereby securing engagement between the pin member (36) and the engaging portion (17).

12 Claims, 11 Drawing Sheets

CARD CONNECTOR HAVING CAM AND PIN MEMBERS FOR SECURING A CARD

BACKGROUND OF THE INVENTION

1. Field of the Invention

The present invention relates to card connectors for electrically connecting cards to circuit boards and, particularly, to a card connector for retaining a card for a portable device.

2. Description of the Related Art

Japanese patent application Kokai No. 11-135192 discloses a card connector of this type. This card connector comprises a body, a slider pushed into the body along with a card, a spring provided between the slider and the body, a cam mechanism consisting of a cam provided on a side face of the slider and a pin provided on a side wall of the body, and a pin-depressing spring attached to an lateral wall extending laterally from the side wall of the body. The cam mechanism works as a lock/unlock mechanism for the slider. The card insertion/removal is made by push-push operation on the card edge.

In the above card connector, however, the lock/unlock mechanism is so complex and the number of parts is so large that it is difficult to reduce the manufacturing cost. In addition, the lateral wall extending laterally from the body side wall makes it difficult to miniaturize the device.

SUMMARY OF THE INVENTION

Accordingly, it is an object of the invention to provide a card connector capable of reducing the number of parts, simplifying the mechanism, reducing the manufacturing cost, and miniaturizing the device.

According to one aspect of the invention there is provided a card connector for electrically connecting a detachable card to a circuit board, comprising a case having a pair of side walls, a rear wall, and a bottom wall for retaining the detachable card; a cam member provided in one of the side walls and having an engaging portion; an ejector biased forwardly and being slidable together with the detachable card along the side walls; a pin member supported by the ejector so as to operate along the cam member; a pin control supported by the ejector so as to bias the pin member toward the cam member thereby suppressing movement of the pin member, wherein when the detachable card is inserted into the case to a predetermined position, the pin member engages with the engaging portion of the cam member and the pin control biases the pin member toward the cam member to secure the engagement between the pin member and the engaging portion.

It is preferred that the card connector further comprises a release member consisting of a push rod slidable along the cam member outside the ejector and having a release portion, and a push button projecting forwardly from the case, wherein when the push button is depressed with the card being retained in the case, the release portion of the push rod moves the pin member against the pin control to release the engagement between the pin member and the cam member.

According to another aspect of the invention there is provided a card connector for electrically connecting a detachable card to a circuit board, comprising a case consisting of a case body to be mounted on the circuit board and having a pair of side walls, a rear wall, and a bottom wall and a case cover having a pair of side walls for closing an top opening of the case body; an ejector biased forwardly and being slidable together with the detachable card along the side walls; a pin member having a support section supported by the ejector and a rotary section rotatable about the support section; a cam member provided in one of the side walls of either the case body or the case cover and having a slide section on which the rotary portion of the pin member is slidable and an engaging portion for engagement with the rotary portion; a pin support provided in the ejector so as to restrict movement of the pin member; a pin control supported by the ejector so as to bias the pin member toward the cam member thereby restricting upward movement of the pin member, wherein when the detachable card is inserted into the case to a predetermined position, the rotary portion engages with the engaging portion of the cam member and the pin control biases the pin member toward the cam member to secure the engagement between the rotary portion and the engaging portion.

It is preferred that the card connector further comprises a release member consisting of a push rod slidable along the cam member outside the ejector and having a sloped face tapered toward its front end, and a push button projecting forwardly from the case, wherein when the push button is depressed with the card being retained in the case, the rotary portion of the pin member slides on the sloped face against the pin control to release the engagement between the rotary portion and the engaging portion. The cam member has a guiding section on which the push rod is slidable.

According to still another aspect of the invention there is provided a card connector for electrically connecting a detachable card to a circuit board, comprising a case consisting of a case body to be mounted on the circuit board and having a pair of side walls, a rear wall, and a bottom wall and a case cover having a pair of side walls for closing an top opening of the case body; an ejector biased forwardly and being slidable together with the detachable card along the side walls; a pin member having a support section supported by the ejector and a rotary section rotatable about the support section; a cam member having a heart cam provided in one of the side walls of either the case body or the case cover; a pin control supported by the ejector so as to bias the pin member toward the cam member thereby restricting upward movement of the pin member, wherein when the detachable card is inserted into the case to a predetermined position, the rotary portion of the pin member engages with the heart cam of the cam member and the pin control biases the pin member toward the cam member to secure the engagement between the rotary portion and the engaging portion and, when the card is depressed with the card being retained in the case, the engagement between the rotary portion and the cam member is released.

It is preferred that the ejector comprises a card lock laterally flexible for engagement with an engaging notch of the card and a rib member is provided on either the case body or the case cover to restrict lateral flexure of the card lock.

Since the pin member and the pin control are attached to the ejector and since the cam member is provided in the side wall of the case, it is possible to reduce the number of parts, simplifying the structure, reducing the manufacturing cost, and miniaturizing the device.

DESCRIPTION OF THE PREFERRED EMBODIMENTS

Embodiments of the invention will now be described with reference to the accompanying drawings.

Figure 1:
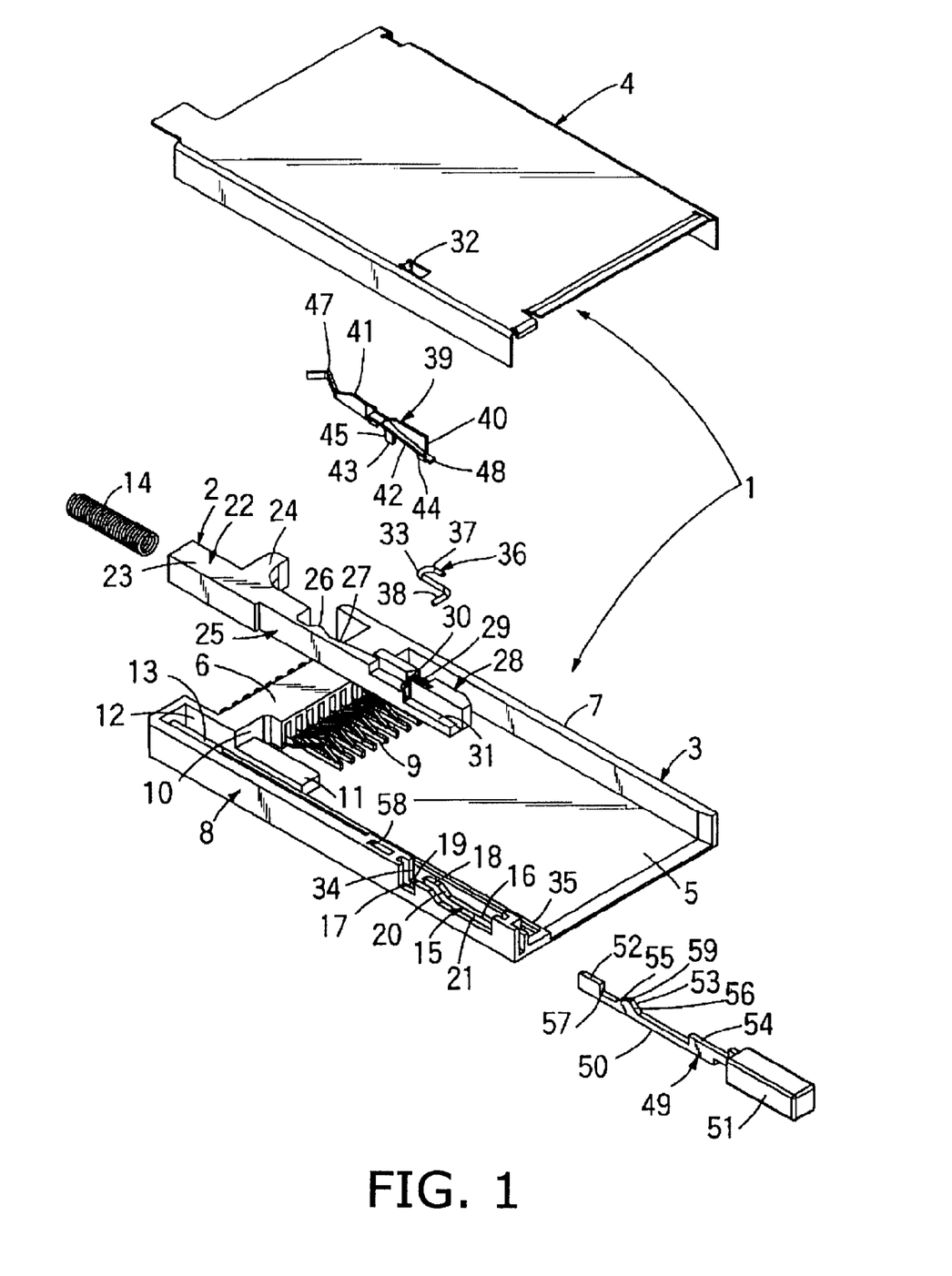
FIG. 1 is an exploded perspective view of a card connector according to the first embodiment of the invention.
Figure 2:
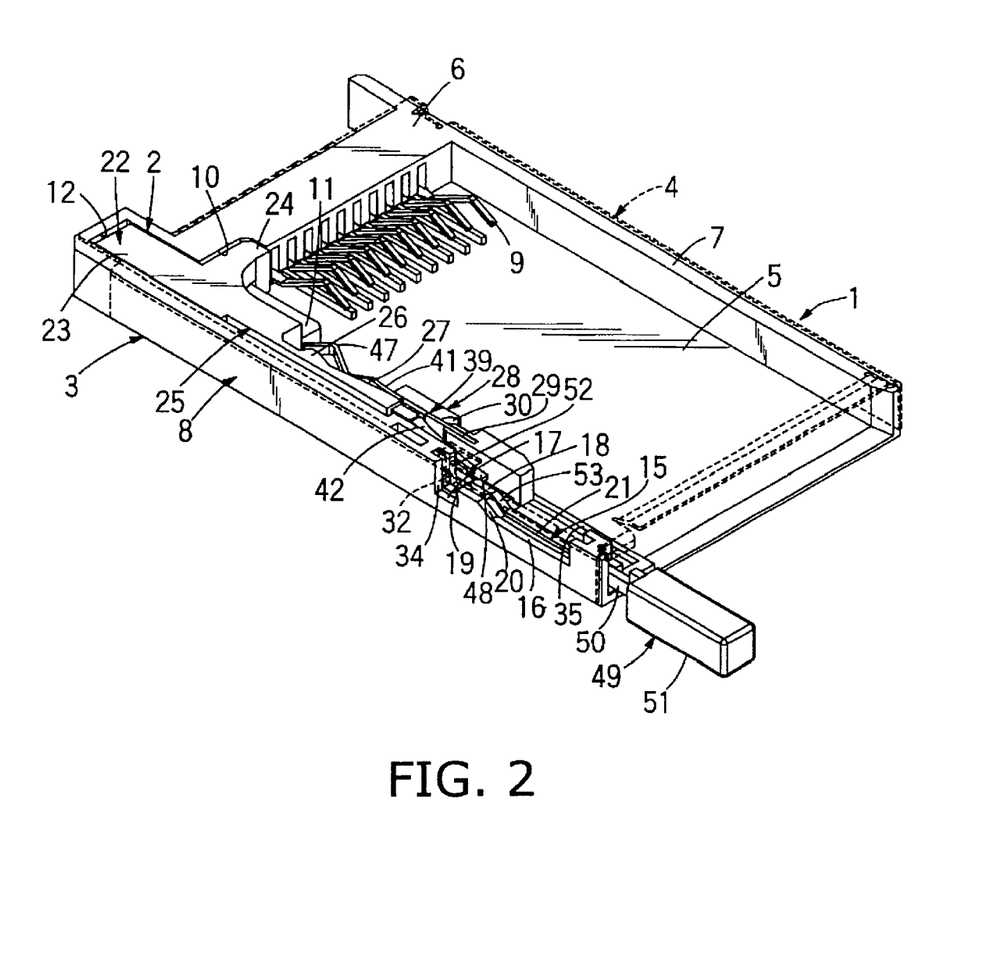
FIG. 2 is a perspective view of the card connector.

In FIGS. 1 and 2, a card connector comprises a case 1 for retaining a detachable card 60 (FIGS. 5 and 6), such as a memory card, and an ejector 2 for slidable in the case 1 along with the card 60.

The case 1 is composed of a case body 3 made of a synthetic resin so as to open at top and front faces and a case cover 4 made of a metal so as to cover the top face of the case 3. The case body 3 has a thin bottom wall 5, a rear wall 6 provided on the rear end of the bottom wall 5, and right and left side walls 7 and 8. The rear ends of the right and left side walls 7 and 8 extend rearwardly beyond the rear wall 6. A predetermined number of terminals 9 are arranged on the rear end of the bottom wall such that they extend rearwardly through the rear wall 6. A cut-out portion 10 is provided in the left side portion of the rear wall 6 and a wrong-insertion preventing portion 11 extends forwardly from the cut-out portion 10. A receiving recess 12 is provided in the joint portion between the rear wall 6 and the left side wall 8. It has a spring receiving groove (not shown) in the bottom face. A boss 13 extends forwardly from the bottom of the receiving recess 12 and a spring 14 is fitted over the boss 13. An inner ridge 35 extends along the left side wall 8 on the bottom wall 5. Opposite edges of the case cover 4 are bent downwardly so as to cover the right and left side walls 7 and 8. The front edge of the case cover 4 is bent slightly upwardly so as to facilitate insertion of the card 60 into the case 1. A stopper tab 32 extends downwardly from the left side edge of the case cover 4.

A cam member 15 is provided in the front portion of the left side wall 8. It has a sliding section 16 lower than the left side wall 8 and an engaging recess 17 provided behind the sliding section 16. The sliding section 16 has a raised rear portion 18, which is higher than the engaging recess 17. The raised rear portion 18 has a rearward projection 19 and a tapered front face 20. The engaging recess 17 has a vertical rear wall 34 so as to abut on the stopper tab 32 of the case cover 4. A guiding groove 21 extends rearwardly from the front end of the left side wall 8 to divide the cam member 15 into two halves.

The ejector 2 is provided between the left side wall 8 and the inner ridge 35. The fitting portion 23 is provided at the rear end 22 of the ejector 2 for fitting in the receiving recess 12. The spring 14 is housed in the fitting portion 23 to forwardly bias the ejector 2 in the card removal direction. An abutting portion 24 extends to the right from the fitting portion 23 for engagement with the cut-out portion 10. A side projection 26 is provided on the middle portion 25 of the ejector 2 and a tapered side face 27 extends forwardly from the side projection 26. The front portion 28 of the ejector 2 is made slightly lower than the middle portion 25, and a slit 29 is provided in the front portion 28 in an extension of the tapered side face 27. A pair of deep slit portions (not shown) extend downwardly from the slit 29. A circular groove 30 intersects the slit 29, and a step portion 31 extends forwardly from the circular groove 30 along the outside of the front portion 28.

A pin member 36 is provided in the ejector 2. It has a U-shaped support section 37 to be fitted in the circular groove 30 and an L-shaped rotary section 38 for sliding along the cam member 15. The rotary section 38 is rotatable at a bent portion 33 of the support section 37.

A spring member 39 made of a metal is provided in the ejector 2. It is composed of a pin support 40 to be fitted in the slit 29, a card lock 41 extending rearwardly from the pin support 40, and a pin control 42 extending outwardly and then obliquely forwardly from the pin support 40. A rear leg 43 and a front leg 44 extend downwardly from the pin support 40 for fitting in the deep slit portions (not shown) to prevent upward movement of the support section 37 of the pin member 36. An engaging projection 45 is provided on each of the rear and front legs 43 and 44 to prevent these legs 43 and 44 from coming out of the deep slits. It is preferred that the pin support 40 is made such that when it is fitted in the slit 29, its upper end projects from the front portion 28 so that the pin support 40 is press-fitted in the slit 29 under a predetermined pressure. By press-fitting the pin support 40 into the slit 29 and making the U-shaped support 37 of the pin member 36, it is possible to secure the pin member 36 to the pin support 40.

The card lock 41 has a J-shaped engaging projection 47, which is laterally flexible. The pin control 42 is located above the step portion 31 and its front end depresses the rotary portion 38 of the pin member 36 toward the cam member 15 for suppressing upward movement of the rotary portion 38.

A release member 49 extends along the cam member 15 on the outside of the ejector 2. It consists of a push rod 50 for sliding in the guiding groove 21 and a push button 51, which projects from the front end of the case 1. The push rod 50 has a rear engaging portion 52, a release portion 53, and a front engaging portion 54. The release portion 53 has sloped rear and front faces 55 and 56.

As shown in FIGS. 3(a)–(d), the front face 57 of the rear engaging portion 52 abuts on the stopper tab 32 of the case cover 4 so that the rear engaging portion 52 is slidable between the rear face 58 of the guiding groove 21 and the stopper tab 32. The release portion 53 is made such that when the rear engaging portion 52 abuts on the front face 58, the peak overlaps the rearward projection 19 and when the front face 57 of the rear engaging portion 52 abuts on the stopper tab 32, the peak 59 does not project rearwardly from the rearward projection 19. The front engaging portion 54 is made such that when the rear engaging portion 52 abuts on the stopper tab 32, it is located above the sliding section 16.

Figure 5:
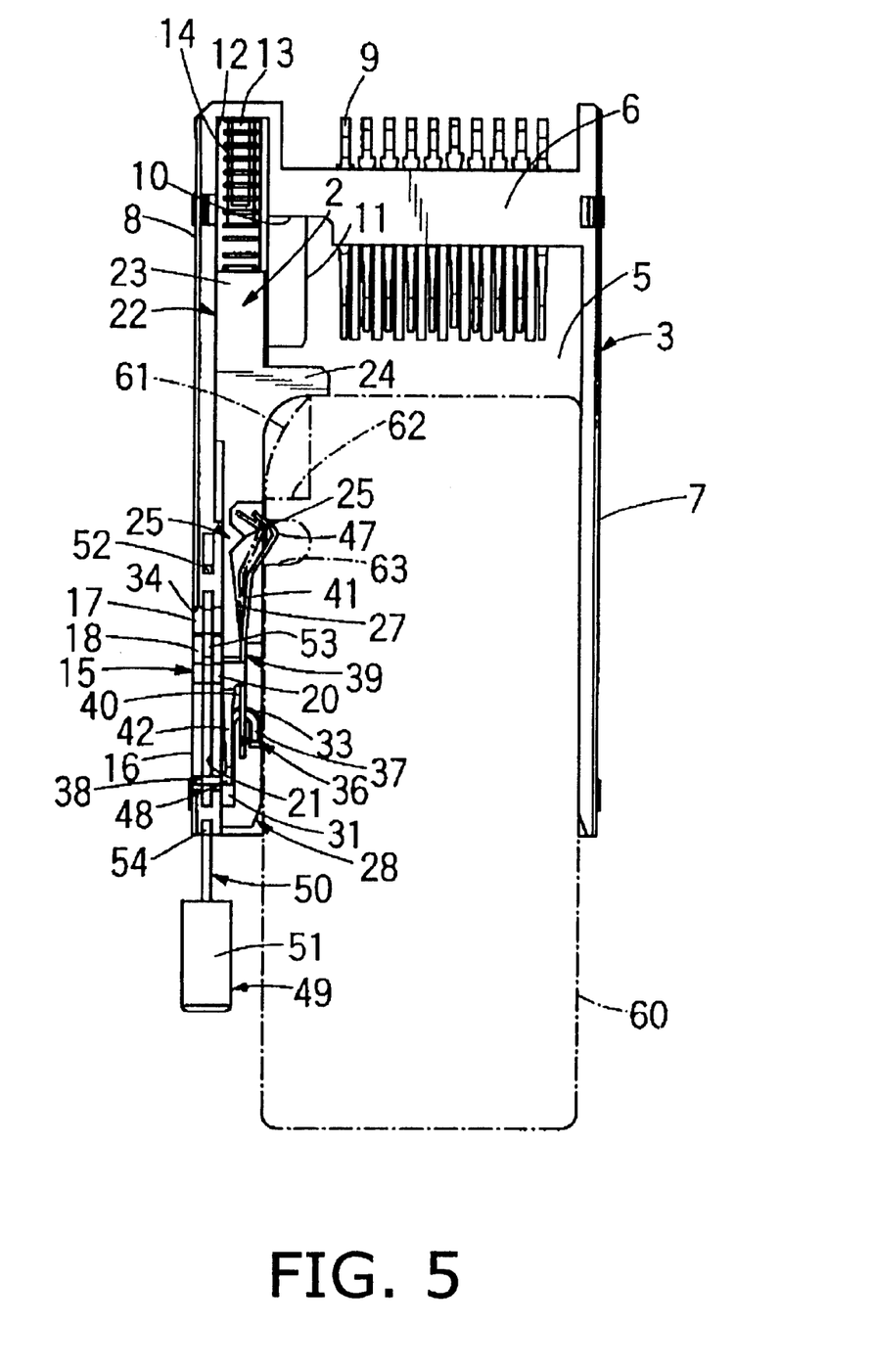
FIGS. 5 and 6 are top plan views of the card connector into which a card is being inserted.

The card 60 will be described with reference to FIGS. 5 and 6. The card 60 has a thin rectangular shape and a rounded left front corner 61 and an engaging recess 62 provided on the back side of the left front corner 61. Also, it has a semi-circular engaging notch 63 in the left side edge and a plurality of contact points (not shown) on the front end corresponding to the terminals 9.

The insertion and removal of the card 60 into and from the card connector will be described with reference to FIGS.

3–6. As shown in FIG. 5, when the card 60 is inserted into the case 1 such that the engaging recess 62 and the engaging notch 63 face the bottom wall 5 and to the left, respectively, the engaging projection 47 abuts on the left side of the card 60 and flexes to the left along the tapered side face 27. It engages the engaging notch 63 while the card 60 abuts on the abutment portion 24. During this period, the ejector 2 and the release member 49 are at rest.

Figure 3A:
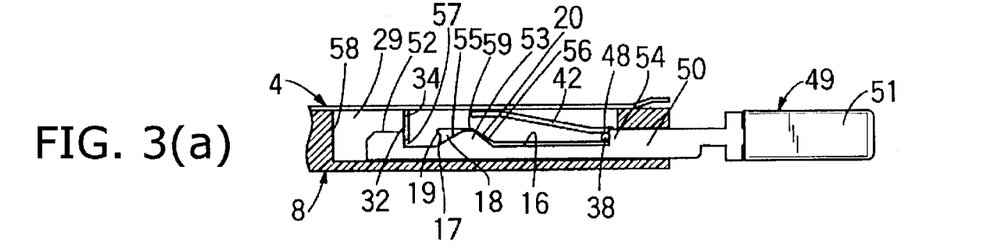
FIGS. 3(a)–(d) are sectional views of the card connector into which a card is being inserted.

As shown in FIG. 3(a), the rotary portions 38 of the pin member 36 is pressed by the pin control 42 toward the sliding section 16 for engagement with the front engaging portion 54.

Figure 3B:
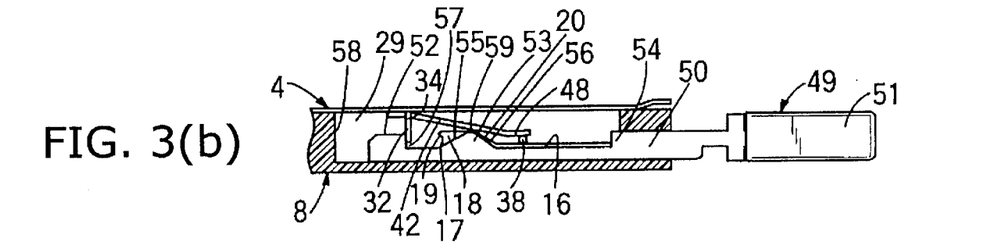
Figure 3C:
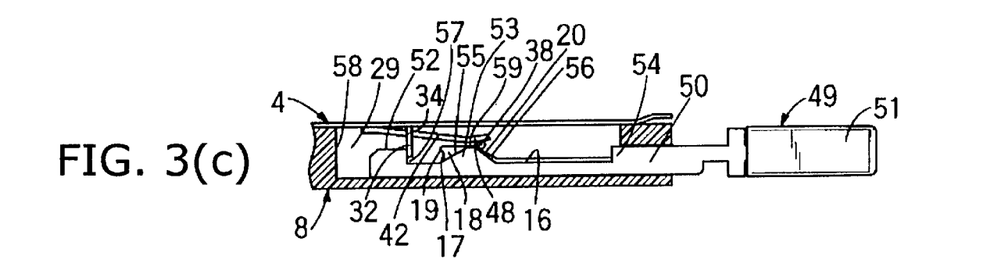

As shown in FIGS. 3(b) and 3(c), when the card 60 is further inserted into the case 1, the ejector 2 slides together with the card 60 along the left side wall 8 against the spring 14 so that the rotary portion 38 slides rearwardly on the sliding portion 16 of the cam member 15.

Figure 3D:
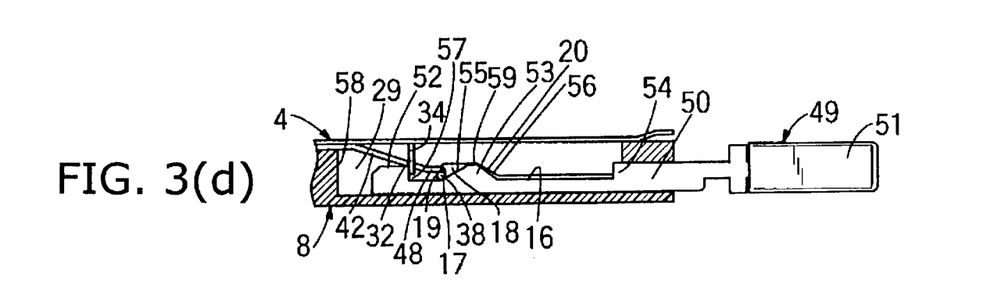

As shown in FIG. 3(d), when the card 60 abuts on the rear wall 6, and the engaging recess 62 and the abutment portion 24 engage the wrong-insertion preventing portion 11 and the cut-out portion 10, respectively, the rotary portion 38 rides over the projection 18 against the pin control 42 and engages with the engaging recess 17.

Figure 6:
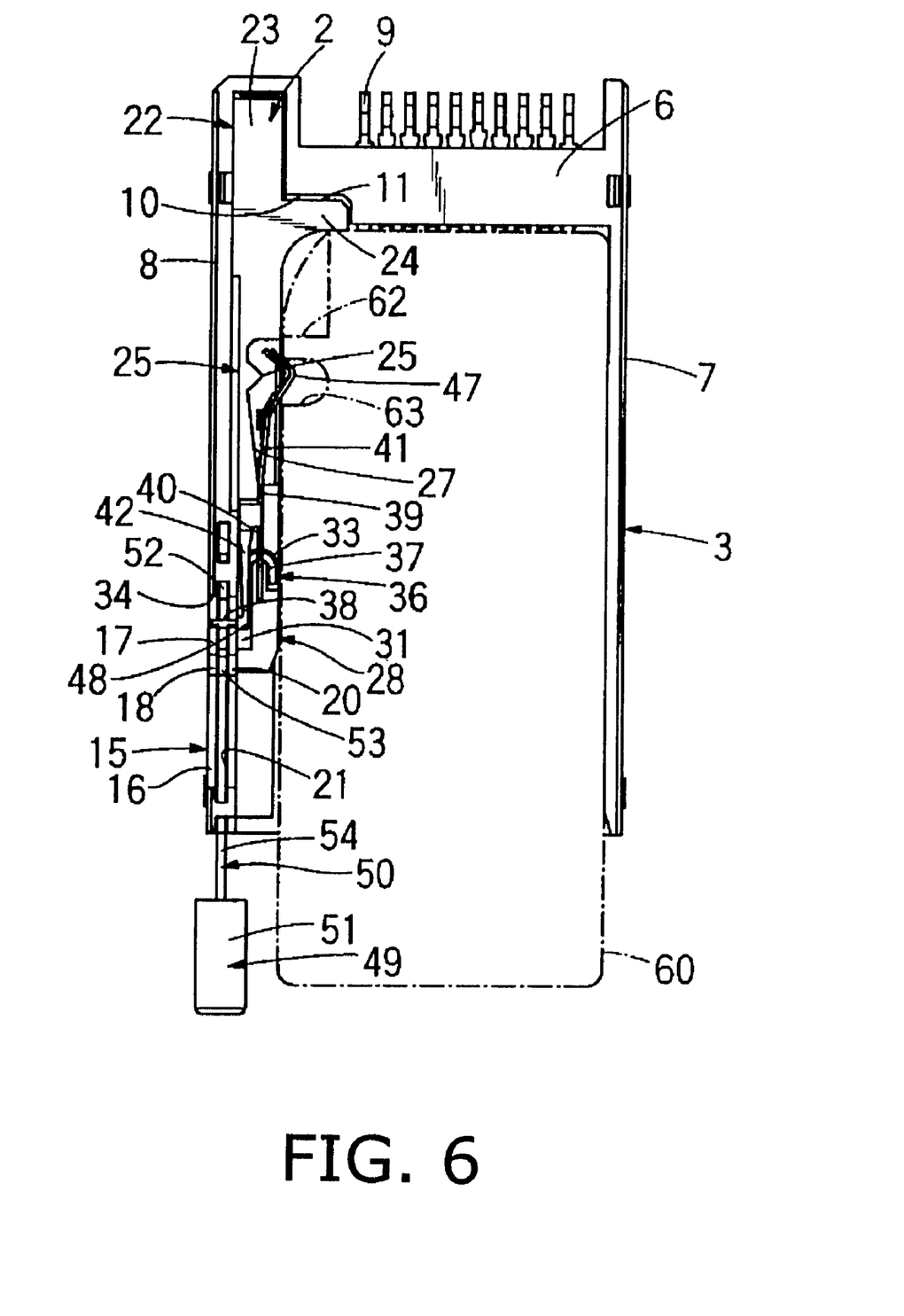

As shown in FIG. 6, the card 60 is retained in place in the case 1. At this point, the rotary portion 38 is forwardly biased by the spring 14 via the ejector 2, the projection 19 is pressed to the sliding portion 16 by the pin control 42 so that the engagement between the rotary portion 38 and the engaging recess 17 is locked. Thus, the connection between the respective terminals 9 and the contact points of the card 60 is secured.

To eject the card 60 from the case 1, the push button 51 is depressed to slide the push rod 50 rearwardly.

Figure 4A:
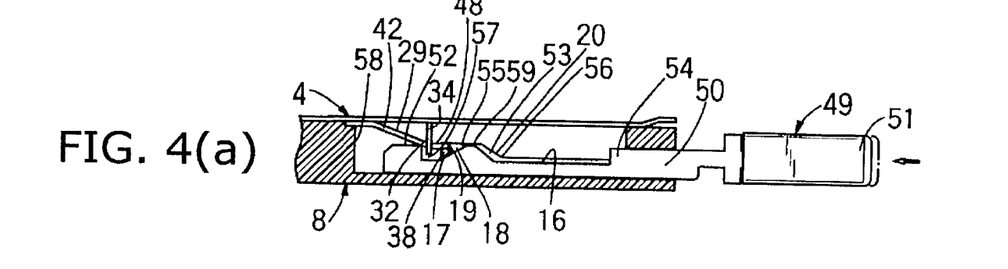
FIGS. 4(a)–(c) are sectional views of the card connector from which a card is being removed.

As shown in FIG. 4(a), the rotary portion 38 gradually goes up along the sloped face 55 and the rear engaging portion 52 abuts on the front wall 58 of the guiding groove 21.

Figure 4B:
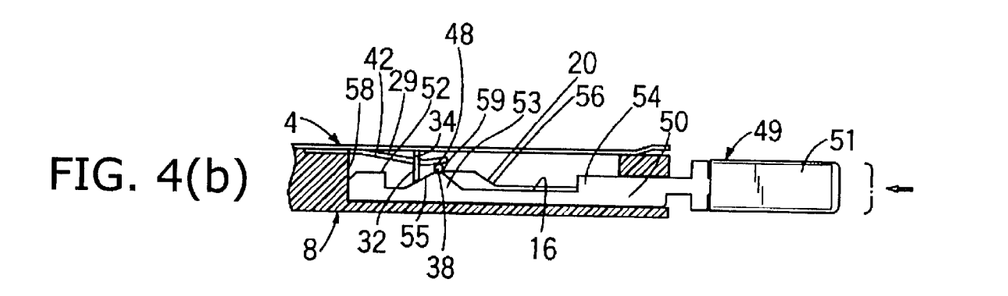

As shown in FIG. 4(b), when the peak 59 of the release portion 53 overlaps the projection 19, the engagement between the rotary portion 38 and the engaging recess 17 is released.

Figure 4C:
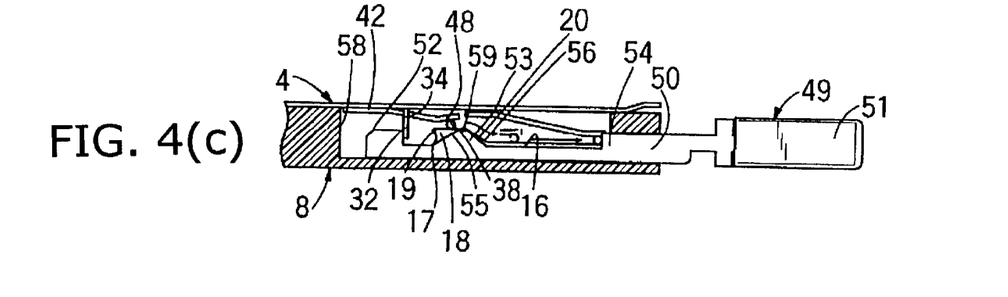

As shown in FIG. 4(c), the rotary portion 38 slides forwardly on the sliding portion 16 against the spring 14 and engages with the front engaging portion 54, bringing the releasing member 49 forwardly and the push button 51 to the position prior to depression. Along with such movement of the rotary portion 38, the ejector 2 slides forwardly together with the card 60 to the original position as shown in FIG. 5. When the card 60 is pulled under such conditions, the engaging projection 47 is flexed to the left to release the engagement between the engaging projection 47 and the engaging recess 63 so that the card 60 is ejected from the case 1.

Figure 7:
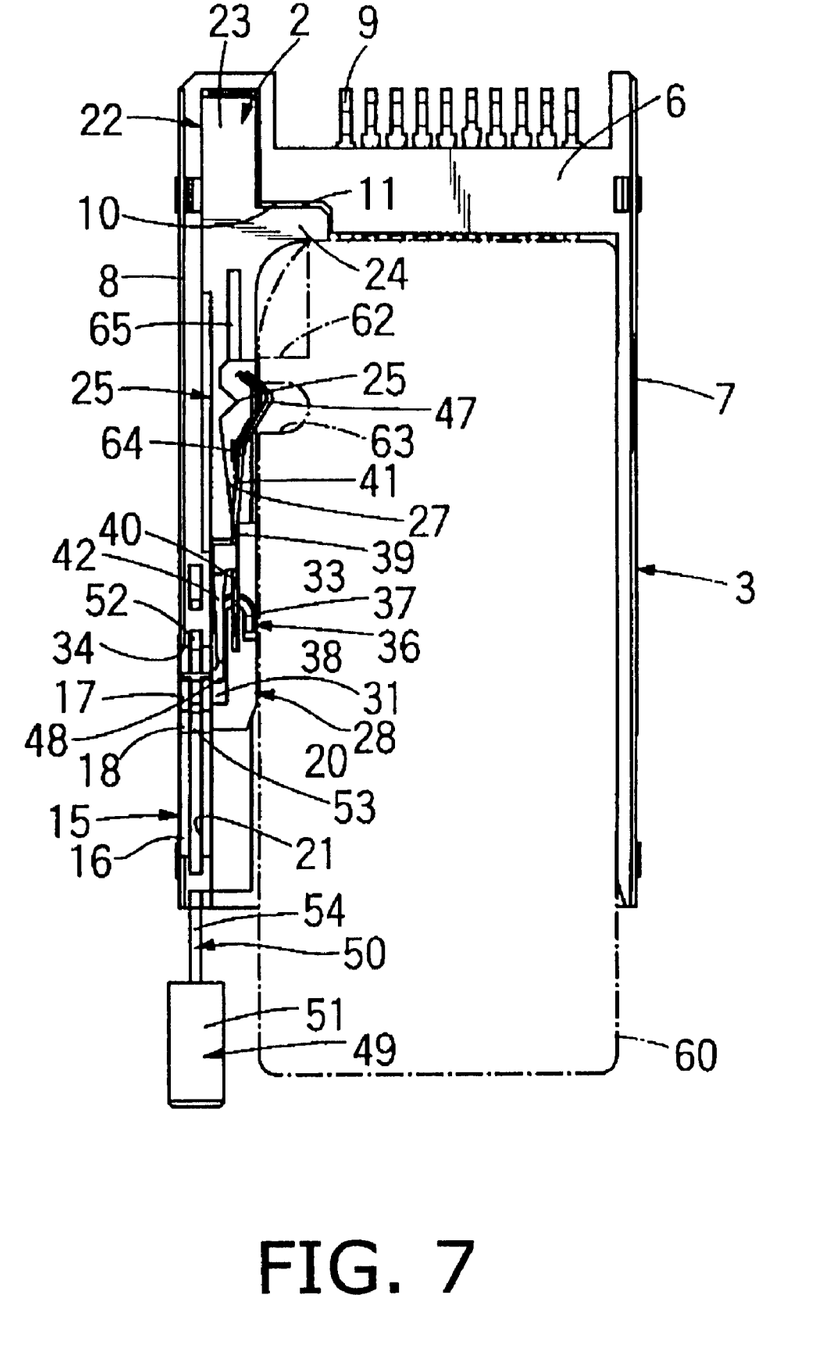
FIG. 7 is a top plan view of the card connector in which a rim member is provided on the case body.

In FIG. 7, a rib member 64 is provided on the bottom wall 5 and a fine groove 65 is provided in the rear portion 22 of the ejector 2 such that the rib member 64 is inserted into the fine groove 65. The flexure of the card lock 41 to the left is controlled so that it is possible to prevent the card 60 from falling from the case 1. Alternatively, the rib member 64 may be provided on the case cover 4.

Figure 8:
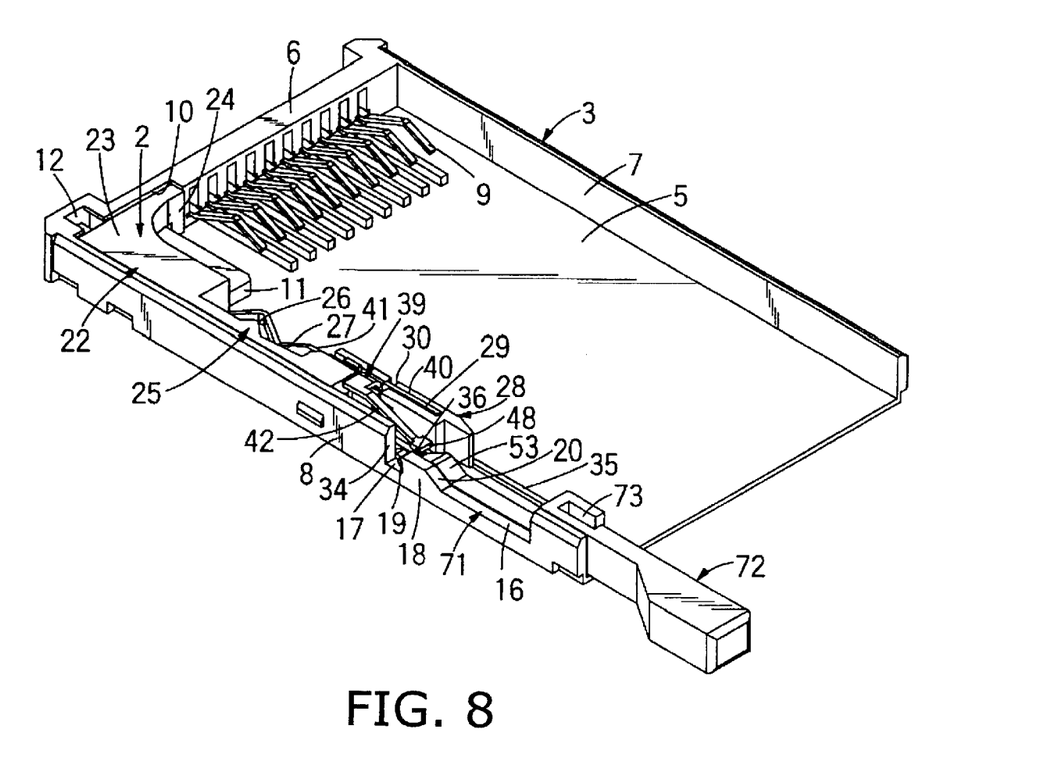
FIGS. 8 and 9 are perspective views of a variation to the first embodiment of the invention.
Figure 9:
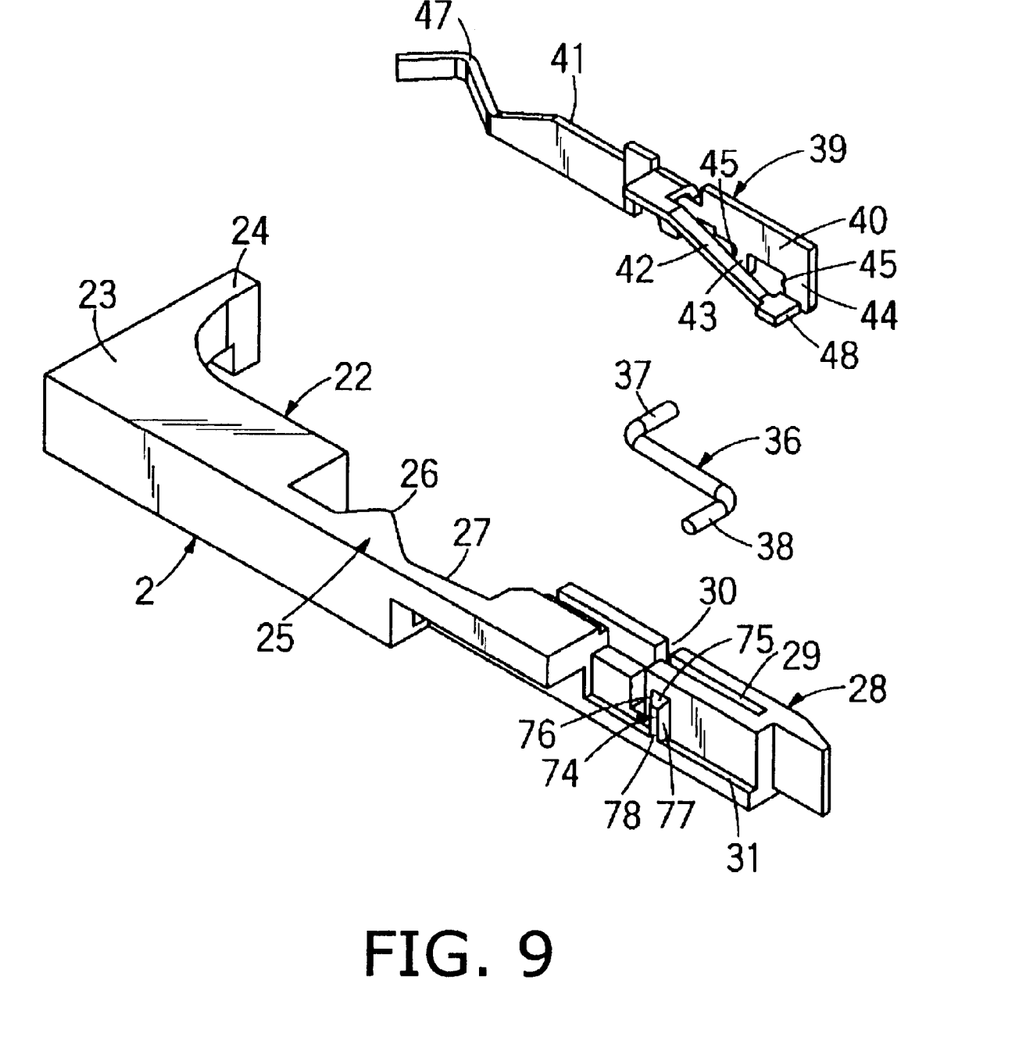

In FIGS. 8 and 9, the guiding groove 21 is eliminated such that the release member 72 slides along the inside face of the cam member 71. An engaging groove 73 is provided near the center of the release member 72 and the stopper tab 32 is provided at a position corresponding to the engaging groove 73 such that the stopper tab 32 engages with the engaging groove 73 to control the forward sliding distance of the release member 72.

As best shown in FIG. 9, a slide projection 74 is provided on the outside of the front section 28 of the ejector 2. The slide projection 74 is lower than the front section 28 and has tapered side, rear, and front faces 75, 76, and 77, reducing the area of slide face 78. While the card 60 is inserted or removed from the case, the rotary portion 38 of the pin member 36 slides on the slide face 78. The area of the slide face 78 is so small that the rotary portion 38 rotates very smoothly. The tapered face 75 makes it easy to attach the pin member 36 to the support groove 30. The support portion 37 of the pin member 36 has an L-shaped form. The guiding groove 21 may be replaced by a through-hole through which the release member 49 slides.

Figure 10:
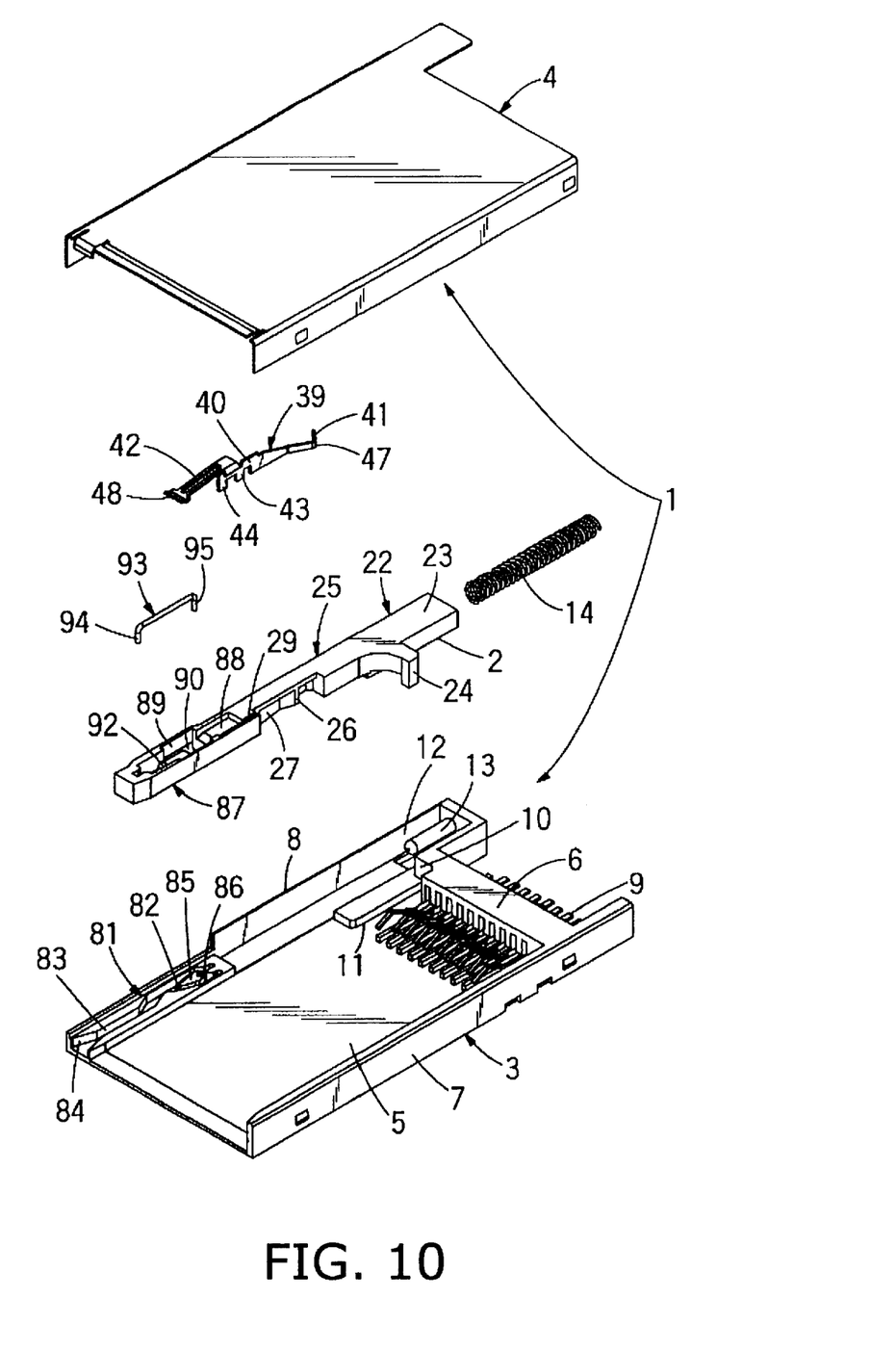
FIG. 10 is an exploded perspective view of a card connector according to the second embodiment of the invention.
Figure 11:
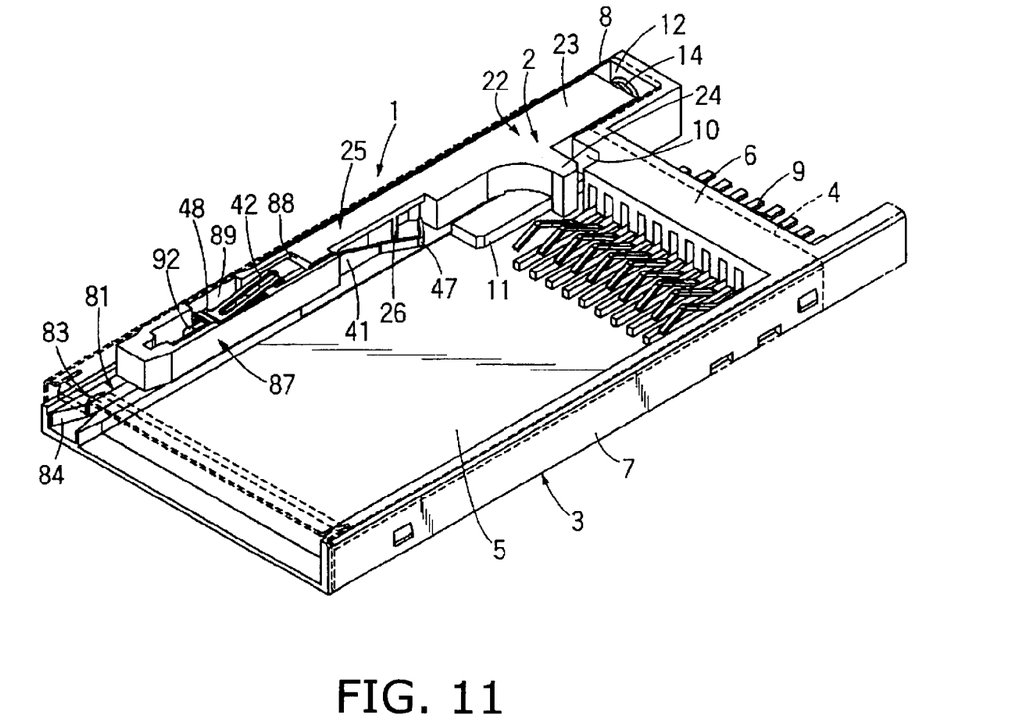
FIG. 11 is a perspective view of the second embodiment.

In FIGS. 10 and 11, like parts of the second embodiment are given the same reference numerals as those of the first embodiment and their description will be omitted. A cam member 81 is provided in the front portion of the left side wall 8. It consists of a loop-shaped cam groove 82 and a guide groove 83 provided in front of the cam groove 82. The guide groove 83 has a tapered front portion 84. The cam groove 82 is a so-called "heart cam" which has an engaging portion 86 in the rear recess of a heart-shaped raised portion 85.

The ejector 2 extends along the inside face of the left side wall 8 and its front section 87 is slidable on the cam member 81. A slit 29 is provided in the front section 87 in an extension of the tapered side face 27. A spring member 39 is press-fitted in the slit 29. The first recess 88 is provided in the front section 87 on the outside of the slit 29 and the second recess 89 is provided in front of the first recess 88. A pin control 42 is fitted in the first and second recesses 88 and 89, and the front portion of the first recess 88 is tapered along the slope of the pin control 42. An opening 90 as wide as the second recess 89 is provided behind the second recess 89, and a pin hole (not shown) is provided toward the front. A slide face 92 with a convex surface is provided between the opening 90 and the pin hole. The pin hole receives the support section 94 of a C-shaped pin member 93 and the opening 90 receives the rotary section 95 of the pin member 93 such that the pin member 93 is slidable on the slide face 92 and rotatable about the support portion 94. The pin control 42 presses down the pin member 93 to restrict its upward movement.

The operation of the card connector according to the second embodiment will be described.

When the card (not shown) is inserted into the case 1, the support portion 94 of the pin member 93 slides forwardly along the guiding groove 83 and the rotary portion 95 slides counterclockwise in the cam groove 82. When the card is inserted to the predetermined position, the rotary portion 95 engages with the engaging portion 86. At this point, it is biased forwardly by the spring 14 via the ejector 2 and the pin member 93 is depressed by the pin control 42 so that the engagement between the rotary portion 95 and the engaging portion 86 is secured. Along with such movement of the rotary portion 95, the card is retained in place and the respective terminals 9 are connected to the contact points of the card.

To eject the card 60 form the case 1, the card is pushed in slightly. The rotary portion 95 slides counterclockwise in the cam groove 82 to release the engagement between the rotary portion 95 and the engaging portion 86. The rotary portion 95 slides counterclockwise in the cam groove 82 against the spring 14 to the original position. Along with such movement of the rotary portion 95, the ejector 2 slides forwardly together with the card to the original condition, under which the card is pulled out of the case 1.

The cam member 15 or 81 provided in the side wall of the case body 3 in the first or second embodiment may be provided on the side of the case cover 4. The card used in the card connector according to the first or second embodiment may be any card mountable in a portable device such as a memory card or IC card.

As has been described above, according to the invention, the pin member and pin control are attached to the ejector and the cam member is provided in the side wall of the case so that it is possible to reduce the number of parts, simplify the structure, reduce the manufacturing cost, and miniaturize the device. The parts, such as an ejector, pin control, and pin member, are provided on the case for assembling so that it is possible to simplify the assembling and reduce the manufacturing cost.

What is claimed is:

1. A card connector for electrically connecting a detachable card to a circuit board, comprising:

a case having a pair of side walls, a rear wall, and a bottom wall for retaining said detachable card;

a cam member provided in an upper surface of one of said side walls and having an engaging portion, said cam member being made within a thickness of said one of said side walls;

an ejector biased forwardly and being slidable together with said detachable card along an inside surface of said one of said side walls;

a pin member supported by said ejector so as to operate along said cam member;

a spring member provided in said ejector so as to bias said pin member toward said cam member thereby suppressing movement of said pin member, wherein when said detachable card is inserted into said case to a predetermined position, said pin member engages with said engaging portion of said cam member and said spring member biases said pin member toward said cam member to secure said engagement between said pin member and said engaging portion.

2. The card connector according to claim 1, which further comprises a release member consisting of a push rod slidable along said cam member outside said ejector and having a release portion, and a push button projecting forwardly from said case, wherein when said push button is depressed with said card being retained in said case, said release portion of said push rod moves said pin member against said spring member to release said engagement between said pin member and said cam member.

3. The card connector according to claim 1, wherein said spring member comprises a card lock laterally flexible for engagement with an engaging notch of said card.

4. A card connector for electrically connecting a detachable card to a circuit board, comprising:

a case consisting of a case body to be mounted on said circuit board and having a pair of side walls, a rear wall, and a bottom wall and a case cover having a pair of side walls for closing an top opening of said case body;

an ejector biased forwardly and being slidable together with said detachable card along said side walls, and having a card lock laterally flexible for engagement with an engaging notch of said card;

a rib member provided on either said case body or said case cover to restrict lateral flexure of said card lock;

a pin member having a support section supported by said ejector and a rotary section rotatable about said support section;

a cam member having a heart cam provided in one of said side walls of either said case body or said case cover;

a spring member supported by said ejector so as to bias said pin member toward said cam member thereby restricting upward movement of said pin member, wherein when said detachable card is inserted into said case to a predetermined position, said rotary portion of said pin member engages with said heart cam of said cam member and said spring member biases said pin member toward said cam member to secure said engagement between said rotary portion and said engaging portion and, when said card is depressed with said card being retained in said case, said engagement between said rotary portion and said cam member is released.

5. A card connector for electrically connecting a detachable card to a circuit board, comprising:

a case mounted on said circuit board and having a pair of side walls, a rear wall, and a bottom wall;

a cam member provided in an upper surface of one of said side walls of said case and having a slide section and an engaging portion, said cam member being made within a thickness of said one of said side walls;

an ejector biased forwardly and being slidable together with said detachable card along an inside surface of said one of said side walls;

a pin member having a support section supported by said ejector and a rotary section rotatable about said support section, slidable on said slide section of said cam member, and engageable with said engaging portion of said cam member;

a spring member provided in said ejector so as to restrict movement of said pin member and bias said pin member toward said cam member thereby restricting upward movement of said pin member, wherein when said detachable card is inserted into said case to a predetermined position, said rotary portion engages with said engaging portion of said cam member and said spring member biases said pin member toward said cam member to secure said engagement between said rotary portion and said engaging portion.

6. The card connector according to claim 5, which further comprises a release member consisting of a push rod slidable along said cam member outside said ejector and having a sloped face tapered toward its front end, and a push button projecting forwardly from said case, wherein when said push button is depressed with said card being retained in said case, said rotary portion of said pin member slides on said sloped face against said spring member to release said engagement between said rotary portion and said engaging portion.

7. The card connector according to claim 6, wherein said cam member has a guiding section on which said push rod is slidable.

8. The card connector according to claim 5, wherein said spring member comprises a card lock laterally flexible for engagement with an engaging notch of said card.

9. A card connector for electrically connecting a detachable card to a circuit board, comprising:

a case consisting of a case body to be mounted on said circuit board and having a pair of side walls, a rear wall, and a bottom wall and a case cover having a pair of side walls for closing a top opening of said case body;

a cam member provided in one of said side walls of said case cover and having a slide section and an engaging portion;

an ejector biased forwardly and being slidable together with said detachable card along an inside surface of said one of said side walls;

a pin member having a support section supported by said ejector and a rotary section rotatable about said support section, slidable on said slide section of said cam member, and engageable with said engaging portion of said cam member;

a spring member provided in said ejector so as to restrict movement of said pin member and bias said pin member toward said cam member thereby restricting upward movement of said pin member, wherein when said detachable card is inserted into said case to a predetermined position, said rotary portion engages with said engaging portion of said cam member and said spring member biases said pin member toward said cam member to secure said engagement between said rotary portion and said engaging portion.

10. The card connector according to claim 9, which further comprises a release member consisting of a push rod slidable along said cam member outside said ejector and having a sloped face tapered toward its front end, and a push button projecting forwardly from said case, wherein when said push button is depressed with said card being retained in said case, said rotary portion of said pin member slides on said sloped face against said spring member to release said engagement between said rotary portion and said engaging portion.

11. The card connector according to claim 10, wherein said cam member has a guiding section on which said push rod is slidable.

12. The card connector according to claim 9, wherein said spring member comprises a card lock laterally flexible for engagement with an engaging notch of said card.

* * * * *